United States Patent
Cao

(10) Patent No.: US 9,426,534 B2
(45) Date of Patent: Aug. 23, 2016

(54) METHOD AND SYSTEM FOR PROVIDING MOBILE ALERT SERVICE, AND RELATED DEVICE

(75) Inventor: Gang Cao, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 139 days.

(21) Appl. No.: 14/350,065

(22) PCT Filed: Feb. 24, 2012

(86) PCT No.: PCT/CN2012/071567
§ 371 (c)(1),
(2), (4) Date: Apr. 4, 2014

(87) PCT Pub. No.: WO2012/155574
PCT Pub. Date: Nov. 22, 2012

(65) Prior Publication Data
US 2014/0282707 A1  Sep. 18, 2014

(30) Foreign Application Priority Data
Oct. 25, 2011  (CN) .......................... 2011 1 0327192

(51) Int. Cl.
*H04N 7/16*      (2011.01)
*H04N 21/61*    (2011.01)
*H04W 4/22*     (2009.01)
*H04N 21/488*  (2011.01)

(52) U.S. Cl.
CPC ...... *H04N 21/6181* (2013.01); *H04N 21/4882* (2013.01); *H04W 4/22* (2013.01)

(58) Field of Classification Search
CPC ....................... H04N 21/4882; H04N 21/6181
See application file for complete search history.

(56) References Cited

U.S. PATENT DOCUMENTS

| 2006/0010240 | A1* | 1/2006 | Chuah ........................... 709/228 |
| 2009/0150947 | A1* | 6/2009 | Soderstrom ..................... 725/93 |
| 2009/0286502 | A1  | 11/2009 | Sennett |
| 2010/0124898 | A1* | 5/2010 | Qu et al. .................... 455/404.1 |
| 2010/0279668 | A1* | 11/2010 | Cao ............................. 455/414.1 |

(Continued)

FOREIGN PATENT DOCUMENTS

| CN | 101340248 A | 1/2009 |
| CN | 102006556 A | 4/2011 |
| CN | 102217334 A | 10/2011 |

OTHER PUBLICATIONS

Commercial Mobile Alert Service Architecture and Requirements Dec. 10, 2007.
Supplementary European Search Report in European application No. 12786347.0, mailed on Jul. 14, 2014.
English Translation of the Written Opinion of the International Search Authority in international application No. PCT/CN2012/071567, mailed on Jul. 26, 2012.

(Continued)

*Primary Examiner* — Joshua Taylor
(74) *Attorney, Agent, or Firm* — Neifeld IP Law, PC

(57) ABSTRACT

A method and system for providing a mobile alert service, and a related device are disclosed. The method for providing a mobile alert service includes: a mobile terminal receives an enhanced Commercial Mobile Alert Service (CMAS) message from a CMAS network; and an alert channel is located based on the enhanced CMAS message, and the alert program content on the alert channel is played. Through adding related information required for playing the alert program of the mobile television into the enhanced CMAS message, the disadvantage that only short text information can be delivered in a conventional CMAS system is overcome, so that the alert program may be watched by the mobile terminal user rapidly, promptly and intuitively.

5 Claims, 2 Drawing Sheets

(56) References Cited

U.S. PATENT DOCUMENTS

2011/0081882 A1 4/2011 Daly
2011/0239253 A1* 9/2011 West et al. ..................... 725/46

OTHER PUBLICATIONS

International Search Report in international application No. PCT/CN2012/071567, mailed on Jul. 26, 2012.

* cited by examiner

METHOD AND SYSTEM FOR PROVIDING MOBILE ALERT SERVICE, AND RELATED DEVICE

TECHNICAL FIELD

The disclosure relates to the field of communication technology, and in particular to a method and system for providing a mobile alert service, and a related device.

BACKGROUND

In a Commercial Mobile Alert Service (CMAS) system, currently emergent alert information for public security is sent to mobile terminal users mainly by means of cell broadcast. The types of alerts include: a state-leader-level alert, a disaster alert, a terrorist attack alert, a child trafficking alert and other alerts.

At present, in a general CAMS system over the world, an alert message is sent to mobile terminal users through a particular cell broadcast channel, by which the alert message may be sent in real time and received conveniently. However, small amounts of information is included in the alert message, i.e., some simple text messages are merely included in the alert message and larger video/audio files are difficult to be delivered, so that the current alert situation cannot be perceived intuitively by the users.

SUMMARY

In view of the above, the disclosure is intended to provide a method and system for providing a mobile alert service, and a related device, so as to solve the problem that a CMAS message includes small amounts of information and the content of the CMAS message is not intuitionistic in the related art.

The disclosure is implemented through the following technical solutions.

The disclosure provides a method for providing a mobile alert service, which includes:

a mobile terminal receives an enhanced Commercial Mobile Alert Service (CMAS) message from a CMAS network; and an alert channel is located based on the enhanced CMAS message, and alert program content on the alert channel is played.

Further, the method may further include:

after the alert program content on the alert channel is played, text-format alert information is acquired from the enhanced CMAS message, and the text-format alert information is displayed on the mobile terminal.

Further, the enhanced CMAS message may include: an identification field of a mobile television, a length field of play data for the mobile television, and a data package of play parameters for the mobile television.

Further, the process that an alert channel is located based on the enhanced CMAS message and alert program content on the alert channel is played may include:

it is determined, based on the identification field of the mobile television, whether play parameters required for playing the alert channel are contained in the enhanced CMAS message; and when it is determined that the play parameters required for playing the alert channel are contained in the enhanced CMAS message, the play parameters are acquired from the enhanced CMAS message, the alert channel is located based on the play parameters, and the alert program content on the alert channel is played; or when it is determined that the play parameters required for playing the alert channel are not contained in the enhanced CMAS message, text-format alert information is acquired from the enhanced CMAS message, and the text-format alert information is displayed on the mobile terminal.

Further, before the play parameters are acquired from the enhanced CMAS message, the method may also include:

it is determined whether a mobile television function is supported by the mobile terminal, and when it is determined that the mobile television function is supported by the mobile terminal, the play parameters are acquired from the enhanced CMAS message.

Further, the method may also include:

when it is determined that the mobile television function is not supported by the mobile terminal, the text-format alert information is acquired from the enhanced CMAS message, and the text-format alert information is displayed on the mobile terminal.

Further, the process that the play parameters are acquired from the enhanced CMAS message may include:

the data package of play parameters for the mobile television corresponding to the alert channel is obtained based on the length field of play data for the mobile television; and the play parameters required for playing the alert channel are parsed from the data package of play parameters for the mobile television.

The disclosure also provides a system for providing a mobile alert service, which includes: a Commercial Mobile Alert Service (CMAS) network and a mobile terminal, wherein the CMAS network is configured to send an enhanced CMAS message; and the mobile terminal is configured to: receive the enhanced CMAS message from the CMAS network, locate an alert channel based on the enhanced CMAS message, and play alert program content on the alert channel.

The disclosure also provides a mobile terminal, which includes: a message receiving unit and a message processing unit, wherein the message receiving unit is configured to receive an enhanced Commercial Mobile Alert Service (CMAS) message from a CMAS network; and the message processing unit is configured to locate an alert channel based on the enhanced CMAS message, and play alert program content on the alert channel.

Further, the message processing unit may be specifically configured to:

determine, based on the identification field of the mobile television, whether play parameters required for playing the alert channel are contained in the enhanced CMAS message; and when it is determined that the play parameters required for playing the alert channel are contained in the enhanced CMAS message, acquire the play parameters from the enhanced CMAS message, locate the alert channel based on the play parameters, and play the alert program content on the alert channel; or when it is determined that the play parameters required for playing the alert channel are not contained in the enhanced CMAS message, acquire text-format alert information from the enhanced CMAS message and displays the text-format alert information on the mobile terminal.

The disclosure has the following beneficial effect:

by means of adding related information required for playing the alert program of the mobile television into the enhanced CMAS message, the disadvantage that only short text information can be delivered in a conventional CMAS system is overcome, so that the alert program may be watched by the mobile terminal user rapidly, promptly and intuitively.

Other features and advantages of the disclosure will be elaborated in the subsequent description, and will partly become obvious from the description or be understood by implementing the disclosure. A purpose and other advantages of the disclosure may be implemented and achieved through a structure pointed out particularly in the description, claims and drawings.

DETAILED DESCRIPTION

The basic idea of the disclosure is that: a mobile terminal receives an enhanced CMAS message from a CMAS network; and an alert channel is located based on the enhanced CMAS message, and the alert program content on the alert channel is played.

Preferred embodiments of the disclosure are elaborated below with reference to the drawings. The drawings constitute part of the disclosure and are used for explaining the principle of the disclosure in combination with the embodiments of the disclosure.

Figure 1:
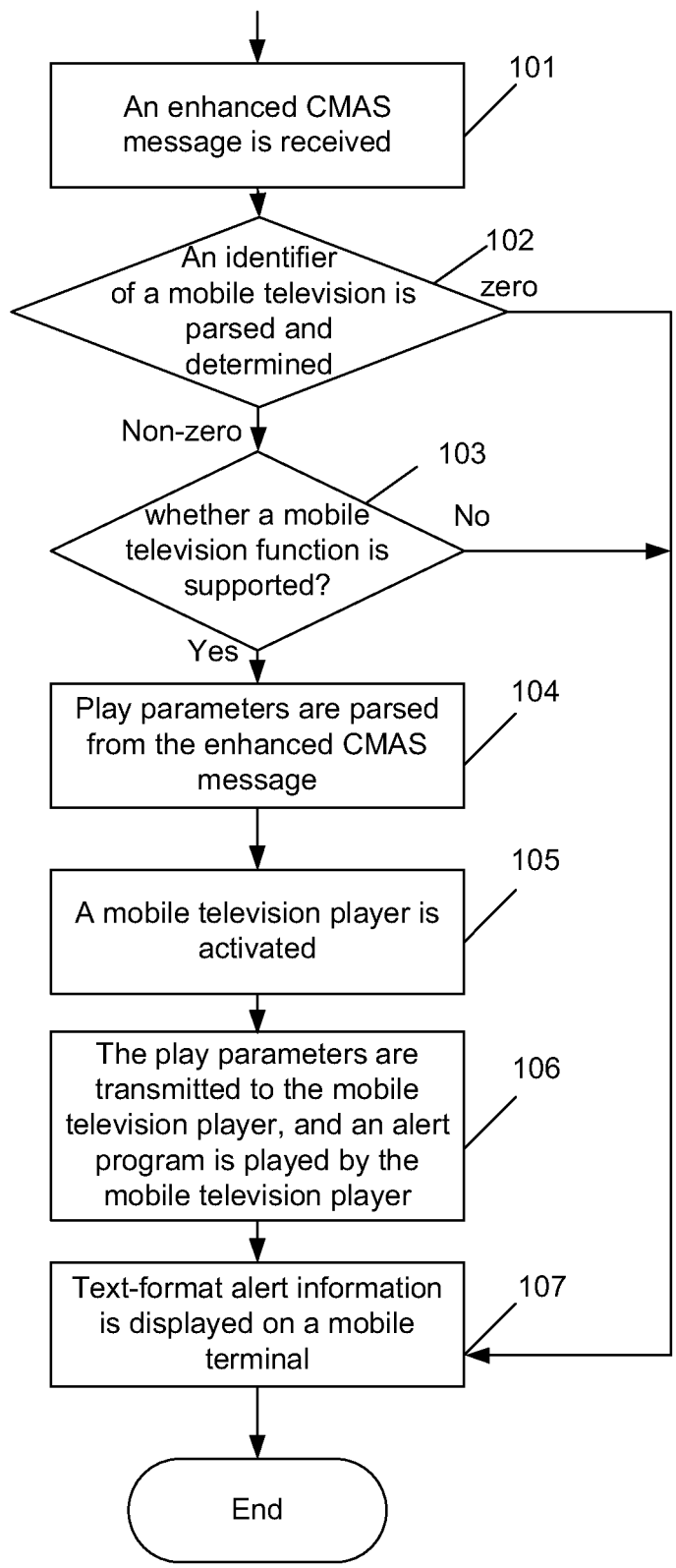
FIG. 1 is a flowchart of a method for providing a mobile alert service in an embodiment of the disclosure.

First, a method for providing a mobile alert service in an embodiment of the disclosure is elaborated with reference to FIG. 1.

FIG. 1 is a flowchart of the method for providing a mobile alert service in an embodiment of the disclosure. As shown in FIG. 1, the method may specifically include the following processing steps:

Step 101: A mobile terminal receives an enhanced CMAS message from a CMAS network.

Specifically, a CMAS system adds related information required for playing an alert program of a mobile television into an enhanced CMAS message sent on a specific cell broadcast channel. The structure of the enhanced CMAS message is shown as FIG. 2, in which the structure of an originally conventional CMAS message is retained except that the following three fields are successively added at the end of the message:

an identifier of the mobile television: if a default value of the identifier is zero, it is indicated that there is no parameter information related to playing of the mobile television in the CMAS message; otherwise, it is indicated that the parameter information related to playing of the mobile television is included in the CMAS message;

the length of a data package of play parameters for the mobile television: by means of the length, a mobile terminal may accurately acquire a data package of play parameters for the mobile television included in the CMAS message; and the data package of play parameters for the mobile television: the file format of the play parameters embedded in the data package is consistent with that embedded in an Electronic Service Guide (ESG) of the conventional mobile television, so the play parameters, such as the address of an Internet (IP) stream, an audio/video format, a sampling rate and a packet mode, of the specific cell broadcast channel may be parsed from the data package through a Session Description Protocol (SDP).

Step 102: After the identification field of the mobile television in the enhanced CMAS message is parsed, it is determined whether play parameters required for playing the alert channel are contained, i.e., it is determined whether the value of the identification field of the mobile television is zero. If the value of the identification field is zero, then Step 107 is executed; otherwise, Step 103 is executed.

Step 103: It is determined whether a mobile television function is supported by the mobile terminal. If the mobile television function is not supported by the mobile terminal, then Step 107 is executed; otherwise, Step 104 is executed.

Step 104: A data package of play parameters for the mobile television corresponding to the alert channel is obtained according to the length of the data package of play parameters for the mobile television in the enhanced CMAS message, and all play parameters required for playing the alert channel of the mobile television are parsed through the SDP.

Step 105: A mobile television player of the mobile terminal is activated.

Step 106: The play parameters obtained in Step 104 are transmitted to the mobile television player, which in turn locates the playing channel in a mobile television network through these play parameters and plays the alert program content on the channel, so that the alert program may be promptly watched on the mobile television. Then, Step 107 is executed.

Step 107: Text-format alert information in the enhanced CMAS message is displayed on the mobile terminal.

Step 108: The processing flow is ended.

Figure 2:
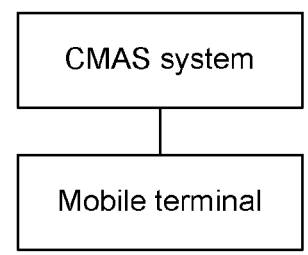
FIG. 2 is a schematic diagram illustrating a structure of a system for providing a mobile alert service in an embodiment of the disclosure.

Next, a system for providing a mobile alert service in an embodiment of the disclosure is elaborated with reference to FIG. 2.

FIG. 2 is a schematic diagram illustrating a structure of the system for providing a mobile alert service in the embodiment of the disclosure. As shown in FIG. 2, the system may specifically include: a CMAS network and a mobile terminal.

The CMAS network is configured to send an enhanced CMAS message. Specifically, a CMAS system adds related information required for playing an alert program of a mobile television into an enhanced CMAS message sent on a specific cell broadcast channel. The structure of the enhanced CMAS message is shown as FIG. 2, in which the structure of an originally conventional CMAS message is retained except that the following three fields are successively added at the end of the message:

an identifier of the mobile television: if a default value of the identifier is zero, it is indicated that there is no parameter information related to playing of the mobile television in the CMAS message; otherwise, it is indicated that the parameter information related to playing of the mobile television is included in the CMAS message;

the length of a data package of play parameters for the mobile television: by means of the length, a mobile terminal may accurately acquire a data package of play parameters for the mobile television included in the CMAS message; and the data package of play parameters for the mobile television: the file format of the play parameters embedded in the data package is consistent with that embedded in an ESG of the conventional mobile television, so the play parameters, such as the address of an IP stream, an audio/ video format, a sampling rate and a packet mode, of the specific cell broadcast channel may be parsed from the data package through the SDP.

The mobile terminal is configured to receive the enhanced CMAS message from the CMAS network, locate an alert channel based on the enhanced CMAS message, and play the alert program content on the alert channel.

Finally, the mobile terminal mentioned in the system in an embodiment of the disclosure is elaborated below with reference to FIG. 3.

Figure 3:
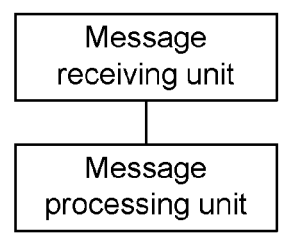
FIG. 3 is a schematic diagram illustrating a structure of a mobile terminal in an embodiment of the disclosure.

FIG. 3 is a schematic diagram illustrating a structure of the mobile terminal in the embodiment of the disclosure. As shown in FIG. 3, the mobile terminal may specifically include: a message receiving unit and a message processing unit.

The message receiving unit is configured to receive the enhanced CMAS message sent from a CMAS network. The enhanced CMAS message may include at least an identification field of the mobile television, a length field of a data package of play parameters for the mobile television, and the data package of play parameters for the mobile television.

The message processing unit is configured to locate an alert channel based on the enhanced CMAS message, and play the alert program content on the alert channel. Specifically, the message processing unit determines, based on the identification field of the mobile television, whether play parameters required for playing the alert channel are contained in the enhanced CMAS message. When it is determined that the play parameters required for playing the alert channel are contained in the enhanced CMAS message, the message processing unit acquires the corresponding play parameters from the enhanced CMAS message, locates the alert channel based on the play parameters, and plays the alert program content on the alert channel. When it is determined that the play parameters required for playing the alert channel are not contained in the enhanced CMAS message, the message processing unit acquires text-format alert information from the enhanced CMAS message, and displays the text-format alert information on the mobile terminal.

Since the specific implementing processes of the system in the embodiment of the disclosure and the mobile terminal therein are elaborated in the above method, they will not be repeated here.

As described above, the embodiments of the disclosure provide a method for providing a mobile alert service, a system for providing a mobile alert service and a related device. Compared with the related art, the embodiments of the disclosure overcome, through adding related information required for playing the alert program of the mobile television into the enhanced CMAS message, the disadvantage that only short text information can be delivered in the conventional CMAS system, and avoids the complex process that ESG information is needed to be received and parsed by a conventional mobile television, so that the alert program may be watched by the mobile terminal user rapidly, promptly and intuitively, thus providing better user experience.

The above are only preferable embodiments of the disclosure, and are not intended to limit the scope of protection of the claims of the disclosure. Any changes or substitutions easily thought of by those skilled in the art within the technical scope disclosed by the disclosure shall fall within the scope of protection of the claims of the disclosure. Therefore, the scope of protection of the claims of the disclosure should be defined as the scope of protection of the claims.

The invention claimed is:

1. A method for providing a mobile alert service, comprising:
  receiving, by a mobile terminal, an enhanced Commercial Mobile Alert Service (CMAS) message from a CMAS network; and
  locating an alert channel based on the enhanced CMAS message, and playing alert program content on the alert channel,
  wherein the enhanced CMAS message is structured by adding following three fields successively at the end of an conventional CMAS message: an identification field of a mobile television, a length field of a data package of play parameters for the mobile television, and the data package of play parameters for the mobile television;
  the locating an alert channel based on the enhanced CMAS message and playing alert program content on the alert channel comprises:
  determining, based on the identification field of the mobile television, whether play parameters required for playing the alert channel are contained in the enhanced CMAS message; and
  when it is determined that the play parameters required for playing the alert channel are contained in the enhanced CMAS message, determining whether a mobile television function is supported by the mobile terminal;
  when the play parameters required for playing the alert channel are contained in the enhanced CMAS message and when the mobile television function is supported by the mobile terminal, obtaining the data package of play parameters for the mobile television corresponding to the alert channel based on the length field of the data package of play parameters for the mobile television; and parsing, from the data package of play parameters for the mobile television, the play parameters required for playing the alert channel; and
  locating the alert channel based on the play parameters, and playing the alert program content on the alert channel.

2. The method according to claim 1, further comprising:
  after the alert program content on the alert channel is played, acquiring text-format alert information from the enhanced CMAS message, and displaying the text-format alert information on the mobile terminal.

3. The method according to claim 1, further comprising:
  when it is determined that the mobile television function is not supported by the mobile terminal, acquiring the text-format alert information from the enhanced CMAS message, and displaying the text-format alert information on the mobile terminal.

4. A system for providing a mobile alert service, comprising:
  a Commercial Mobile Alert Service (CMAS) network and a mobile terminal, wherein
    the CMAS network is configured to send an enhanced CMAS message; wherein the enhanced CMAS message is structured by adding following three fields successively at the end of an conventional CMAS message: an identification field of a mobile television, a length field of a data package of play parameters for the mobile television, and the data package of play parameters for the mobile television; and
    the mobile terminal is configured to: receive the enhanced CMAS message from the CMAS network, locate an alert channel based on the enhanced CMAS message, and play alert program content on the alert channel;

wherein the mobile terminal is configured to: determine, based on the identification field of the mobile television, whether play parameters required for playing the alert channel are contained in the enhanced CMAS message; and when it is determined that the play parameters required for playing the alert channel are contained in the enhanced CMAS message, determine whether a mobile television function is supported by the mobile terminal;

when the play parameters required for playing the alert channel are contained in the enhanced CMAS message and when the mobile television function is supported by the mobile terminal, obtain the data package of play parameters for the mobile television corresponding to the alert channel based on the length field of the data package of play parameters for the mobile television; and parse, from the data package of play parameters for the mobile television, the play parameters required for playing the alert channel; and locate the alert channel based on the play parameters, and play the alert program content on the alert channel.

5. A mobile terminal, comprising: a message receiving unit and a message processing unit, wherein the message receiving unit is configured to receive an enhanced Commercial Mobile Alert Service (CMAS) message from a CMAS network; wherein the enhanced CMAS message is structured by adding following three fields successively at the end of an conventional CMAS message: an identification field of a mobile television, a length field of a data package of play parameters for the mobile television, and the data package of play parameters for the mobile television; and the message processing unit is configured to locate an alert channel based on the enhanced CMAS message, and play alert program content on the alert channel, wherein the message processing unit is configured to:

determine, based on the identification field of the mobile television, whether play parameters required for playing the alert channel are contained in the enhanced CMAS message; and when it is determined that the play parameters required for playing the alert channel are contained in the enhanced CMAS message, determine whether a mobile television function is supported by the mobile terminal;

when the play parameters required for playing the alert channel are contained in the enhanced CMAS message and when the mobile television function is supported by the mobile terminal, obtain the data package of play parameters for the mobile television corresponding to the alert channel based on the length field of the data package of play parameters for the mobile television; and parse, from the data package of play parameters for the mobile television, the play parameters required for playing the alert channel; and locate the alert channel based on the play parameters, and play the alert program content on the alert channel.

\* \* \* \* \*